United States Patent
Pandjiris et al.

[15] 3,670,139
[45] June 13, 1972

[54] WELDING HEAD

[72] Inventors: Anthony K. Pandjiris, St. Louis; Arthur I. Frederick, Webster Groves; Edward J. Weinfurt, St. Louis, all of Mo.

[73] Assignee: The Pandjiris Weldment Co., St. Louis, Mo.

[22] Filed: Dec. 21, 1970

[21] Appl. No.: 99,924

[52] U.S. Cl. .................. 219/130, 219/125 R, 219/136
[51] Int. Cl. ........................................................ B23k 9/00
[58] Field of Search .................... 219/130, 136, 73–75, 219/124, 125

[56] References Cited

UNITED STATES PATENTS

| | | | |
|---|---|---|---|
| 2,439,740 | 4/1948 | Johnson | 219/125 |
| 2,441,507 | 5/1948 | Peters | 219/130 |
| 3,396,263 | 8/1968 | Even et al. | 219/125 |
| 2,432,495 | 12/1947 | Baird | 219/125 |
| 3,200,235 | 8/1965 | Faust | 219/74 |
| 3,549,855 | 12/1970 | Lawrence | 219/130 |

Primary Examiner—R. F. Staubly
Assistant Examiner—Gale R. Peterson
Attorney—Cohn and Powell

[57] ABSTRACT

A welding head having a wire guide tube, through which a welding wire extends, located in and positioned longitudinally of a housing with its wire discharge and in alignment with a flux discharge opening provided in the housing. A plate, made of electrically insulating material, is slidably mounted on the housing and is connected to the wire guide tube for longitudinal adjustment of the nozzle to determine the amount of projection of the welding wire through the flux discharge opening. The plate includes a guide portion extending into an elongate slot formed in and arranged longitudinally of the housing, the guide portion cooperating with the slot margins to guide the plate, and hence the wire guide tube, longitudinally of the housing. Fastening means, made of an electrically insulating material, extends through an elongate hole formed in the plate and arranged longitudinally of the housing, the fastening means interconnecting the plate and housing to retain the plate in longitudinally adjusted positions. Pivot means mount the wire guide tube to the plate on a transverse axis, while wire guide tube-pivoting means selectively move the wire guide tube about the axis to adjust the position of the wire discharge end laterally of the flux discharge opening.

11 Claims, 3 Drawing Figures

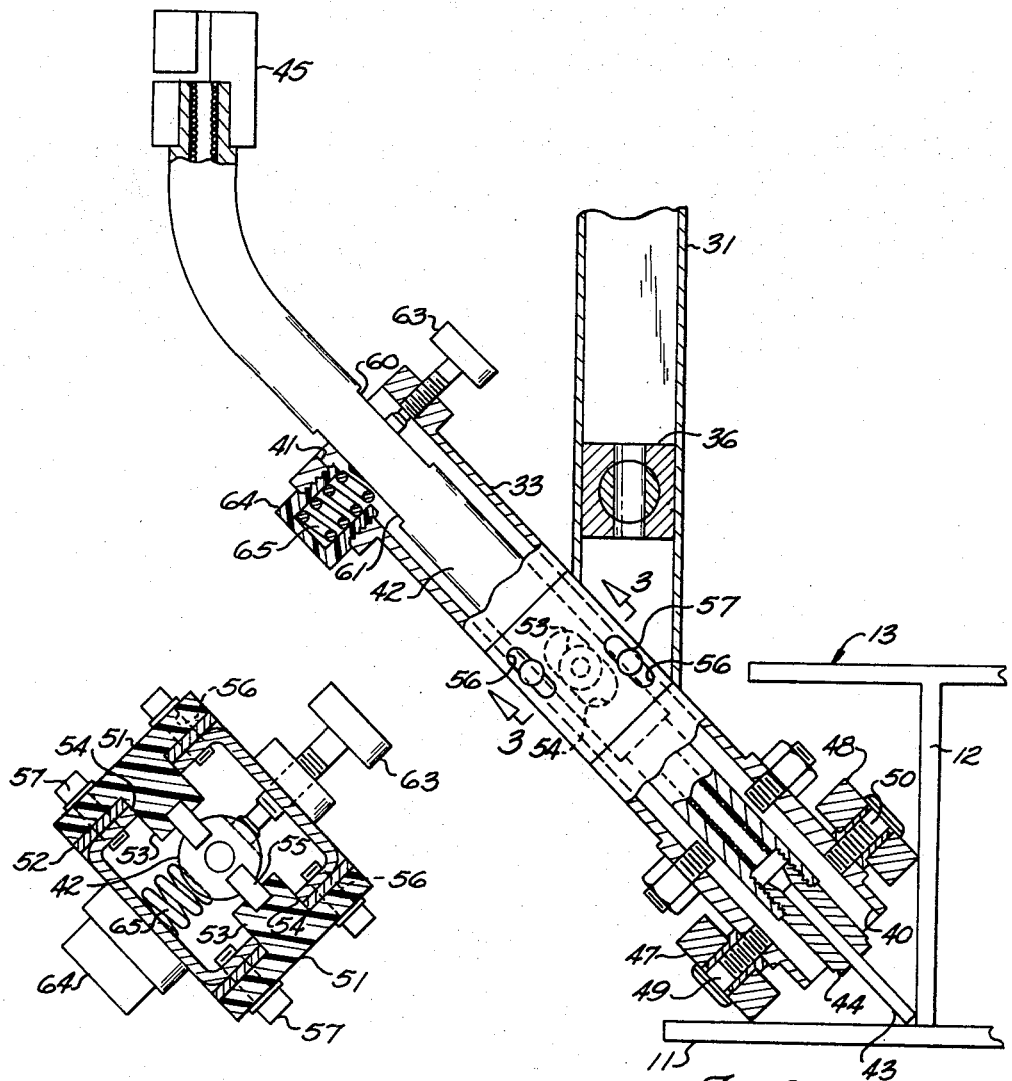

3,670,139

WELDING HEAD

BACKGROUND OF THE INVENTION

This invention relates generally to improvements in a welding head and more particularly to improvements in apparatus for fabricating I-beams.

The heretofore conventional automatic welding equipment of this general type embedded the wire guide tube in a block of insulating material that was located completely inside of a housing. Accordingly, access directly to the block was not possible in order to adjust the position of both the block and wire guide tube directly in a longitudinal direction of the housing whereby to selectively determine the amount of welding wire projection through the flux discharge opening formed in the housing.

SUMMARY OF THE INVENTION

In the present welding head assembly, the wire guide tube is mounted on the housing by means that is accessible externally of the housing whereby the longitudinal position of both the means and the wire guide tube within the housing can be selectively adjusted to determine the amount of welding wire projection through the flux discharge opening of the housing. At the same time, this mounting of the wire guide tube permits the wire guide tube to be pivoted to adjust the position of the wire discharge end of the wire guide tube laterally of the flux discharge opening, and electrically insulates the wire guide tube from the housing.

The present welding head includes a plate, of electrically insulating material, slidably mounted on a housing and connected to a wire guide tube, through which a welding wire extends, for longitudinal adjustment of the wire guide tube within the housing to determine the amount of welding wire projection through the flux discharge opening formed in the housing.

The plate includes a guide portion extending into an elongate slot formed in the housing and arranged longitudinally of the housing, the guide portion cooperating with the slot margins to guide the plate and hence the wire guide tube longitudinally of the housing.

A wire guide tube pivoting means is provided for pivoting the wire guide tube about a transverse axis intermediate of the wire guide tube ends to adjust the position of the wire discharge end of the wire guide tube laterally of the flux discharge opening, the wire guide tube being pivotally mounted to the plate on the housing.

The present welding head provides a fastening means, of an electrically insulating material, that extends through an elongate hole provided in the plate and arranged longitudinally of the housing, the fastening means interconnecting the plate and housing to retain the plate in longitudinally adjusted position. The wire guide tube pivoting means includes a screw, of electrically insulating material, mounted on the housing and engaging the housing in longitudinally spaced relation to the pivot axis.

BRIEF DESCRIPTION OF THE DRAWINGS

FIG. 2 is a cross sectional view taken on a longitudinal vertical plane passed through the welding head, and FIG. 3 is an enlarged cross sectional view taken on line 3—3 of FIG. 2.

DESCRIPTION OF THE PREFERRED EMBODIMENT

Figure 1:
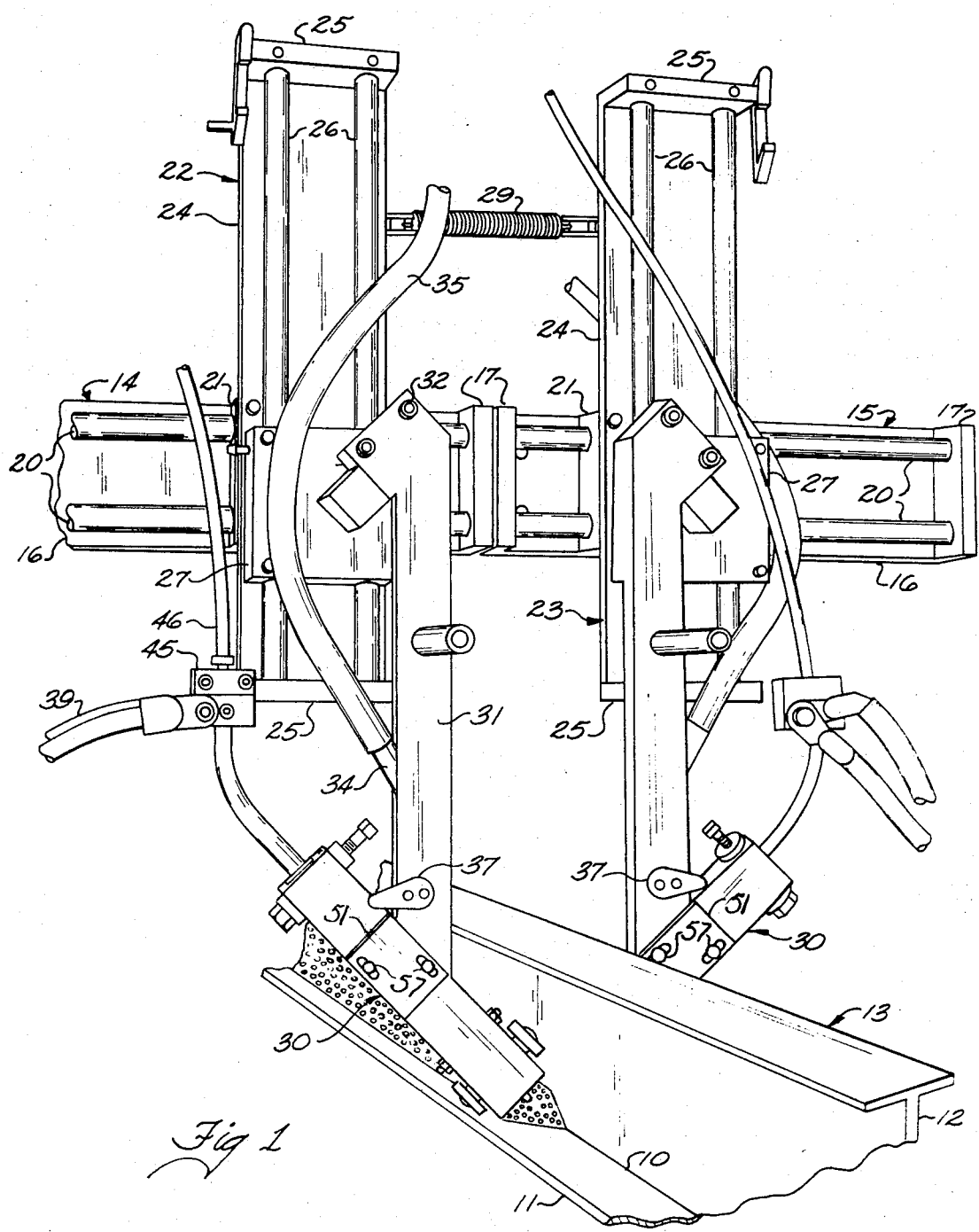
FIG. 1 is a perspective view of a welding apparatus incorporating the improved welding head.

Referring now by characters of reference to the drawings and first to FIG. 1, it will be understood that the welding apparatus is arranged to weld a joint 10 between a horizontal plate 11 and a vertical plate 12 of an I-beam referred to as 13.

The welding apparatus includes a pair of horizontally aligned beams 14 and 15. Each of the horizontal beams 14 and 15 includes a vertical back plate 16 and forwardly projecting end plates 17. Mounted on and between the associated end plates 17 of each of the horizontal beams 14 and 15, are a pair of vertically spaced, horizontal slide bars 20. Slidably mounted on each associated pair of slide bars 20 on each side of the horizontal beams 14 and 15, is a carriage block 21. Each carriage block 21 can slidably move freely, horizontally along its associated slide bars 20 within the limits defined by the end plates 17.

A vertically disposed beam, generally indicated by 22 and 23, is fixed to each of the carriage blocks 21. Similar to the horizontal beams 14 and 15, each of the vertical beams 22 and 23 includes a back plate 24 and a pair of forwardly projecting end plates 25. Mounted on and extending between each associated pair of end plates 25 on each of the vertical beams 22 and 23, are a pair of laterally spaced, vertical slide bars 26. A carriage block 27 is slidably mounted on each associated pair of slide bars 26 on each of the vertical beams 22 and 23. The carriage block 27 can move freely on the slide bars 26 within the limits of the end plate 25.

A tension spring 29 interconnects the back plates 24 of the vertical beams 22 and 23, the spring 29 tending to urge the vertical beams 22 and 23 toward each other, the purpose of which will be apparent upon further detailed description of parts.

Carried by each of the carriage block 27 is a welding head, indicated by 30, the heads 30 being of identical construction so that a detailed description of one will suffice for the other.

The welding head 30 includes an arm 31 attached at its upper end 32 to the carriage block 27 and depending downwardly from the carriage block 27. As is best shown in FIG. 2, the arm 31 is tubular and is connected at its lower end to an inclined, elongate housing 33. From FIG. 1, it is seen that a flux inlet tube 34 communicates with the interior of arm 31 above the housing 33. A flexible hose 35 is attached to the inlet 34 and is used to introduce flux into the arm 31 and thence into the housing 33. A gate valve 36 (FIG. 2) is provided in the arm 31 downstream of the flux inlet tube 34, the gate valve being controlled externally by handle 37 (FIG. 1).

The elongate housing 33 is substantially square in configuration, as is best seen in FIG. 3, and is provided with a flux discharge opening 40 at its lower end, and is provided with an upper end opening 41. Extending longitudinally through the housing 33 is a wire guide tube 42, through which a welding wire 43 extends. The wire discharge end 44 of wire guide tube 42 is located in the flux discharge opening 40 so that the welding wire 43 can project outwardly therethrough to the joint 10 being welded.

From FIG. 1, it is seen that the wire guide tube 42 projects outwardly through the open housing end 41 and is connected by a fitting 45 to a flexible hose 46 through which the welding wire 43 is fed. The fitting 45 is also connected to the electrical conductors 39 that supply the electrical energy to the welding wire 43.

A pair of wheels 47 and 48 are rotatively mounted by stub-shafts 49 and 50 respectively to opposite sides of the housing 33 closely adjacent the lower housing end. Wheel 47 is arranged in position to engage and roll on the top surface of the horizontal beam plate 11 while the other wheel 48 is arranged and positioned to engage and roll on the outer surface of the vertical beam plate 12. The wheels 47 and 48 accurately position and retain the welding wire 43 in alignment with the joint 10 being welded as the head 30 and I-beam 13 move relatively.

A pair of slide plate 51, made of an electrically insulating material, are mounted to opposite sides of housing 33. Each plate 51 includes a flat head portion overlying and seating on a mounting bracket 52 attached to housing 33, and includes a guide portion 53 extending through an elongate slot 54 formed in the side wall of housing 33. The elongate slot 54 is arranged longitudinally in the same direction as the longitudinal axis of housing 33. Pivot pins 55, constituting a pivot means, interconnect opposite sides of the wire guide tube 42 to the guide portions 53 of the opposing plate 51, the pivot pins 55 defining an axis transversely of the wire guide tube 42 intermediate of the wire guide tube ends.

Each of the plates 51 is provided with an elongate hole 56, one such hole at each side of the pivot axis and arranged in the direction of the longitudinal axis of slot 54 and of elongate housing 33. A threaded fastener, made of an electrically insulating material, extends through each of the plate holes 56 and is threadedly attached to the housing 13. It will be understood that the plates and the fasteners 57 electrically insulate the wire guide tube 42 from the housing 33.

In order to adjust the longitudinal position of the wire guide tube 42 within the housing 33 and the amount of welding wire projection through the flux discharge opening 40, the fasteners 57 securing the plate 51 to the housing 33 are loosened and the plates 51 are slidably moved longitudinally as constrained by the movement of plate guide portions 53 in housing slots 54 and by the movement of fasteners 57 in the plate holes 56. Because the plates 51 carry the wire guide tube 52, the longitudinal position of wire guide tube 42 within the elongate housing 33 is adjusted. When appropriately located, the fasteners 57 are tightened securely to clamp the plates 51 securely to the sides of the housing 33.

A wire guide tube pivoting means is provided for pivoting the wire guide tube 42 about the pivot axis to adjust the position of the wire discharge end 44 of wire guide tube 42 laterally of the flux discharge opening 40. This nozzle-pivoting means includes a pair of opposed, elongate flat surfaces 60 and 61 formed on the wire guide tube 42 adjacent the upper open housing end 41. A screw 63, made of an electrically insulating material, is threadedly fastened to the housing 33 and extends into the housing 33 and against the flat nozzle surface 60. A cup 64, made of an electrically insulating material, is threadedly attached to the upper end of housing 33 and receives a compression spring 65, one end of which engages the opposite flat wire guide tube surface 61. By adjusting screw 63, the wire guide tube 42 can be pivoted about the pivot axis provided by pins 55. Because the screw 63 and the cup 64 are of an electrically insulating material, the housing 33 is electrically insulated from the wire guide tube 42.

It is thought that the operation of this welding apparatus has become fully apparent from the foregoing detailed description of parts, but for completeness of disclosure, the operation will be briefly described.

The welding apparatus is located with the horizontal beams 14 and 15 located transversely to the I-beams 13 being formed and with the vertical beams 22 and 23 located on opposite sides of the I-beam 13. The welding heads 30 are disposed on opposite sides of the I-beam 13 so that the wheels 47 and 48 engage the horizontal plate 11 and the vertical plate 12 respectively. It will be understood that the vertical beams 22 and 23 are urged together under the action of spring 29, thereby holding the wheels 48 against opposite sides of the vertical plate 12. In addition, the heads 30 are freely movable in a vertical direction under gravity so that the wheels 47 engage the lower horizontal plate 11. As the welding apparatus and the I-beam move relatively, the carriage blocks 21 can move freely on the slide bars 20 against the loading of spring 29 so as to maintain the horizontal position of the welding heads 30 and the carriage blocks 27 can move freely vertically under gravity on the slide bars 26 to maintain the vertical position of the heads 30.

Flux is fed through the hoses 35, through the inlet tubes 34 and into the housing arms 31, and thence into the housings 33. This flux flow is controlled by the gate valves 36. The welding wires 43 are fed through the hoses 46 and into the wire guide tube 42.

If it is desired to adjust the projection of the wire 43 of each welding head 30 outwardly of the wire guide tube discharge end 44, the fasteners 57 are loosened to enable the plates 51 to be longitudinally and slidably adjusted. Upon longitudinal adjustment of the plates 51, the longitudinal axial position of the wire guide tube 42 carried by the plates 51 is similarly adjusted. The movement of the plates 51 is constrained to a rectilinear longitudinal movement by the action of the plate guide portions 53 in the elongate slots 54 and of the fasteners 57 in the elongate holes 56.

The tube discharge end 44 of wire guide tube 42 can be adjusted laterally of the flux discharge opening 40 by adjustment of the screw 63 against the loading of compression spring 65.

We claim as our invention:

1. A welding head comprising:
   a. a housing provided with a flux discharge opening,
   b. a wire guide tube, through which a welding wire extends, located in and positioned longitudinally of the housing with its wire discharge end in alignment with the flux discharge opening,
   c. a plate of electrically insulating material slidably mounted on the housing and connected to the wire guide tube for longitudinal adjustment of the wire guide tube to determine the amount of welding wire projection through the flux discharge opening,
   d. the housing being provided with an elongate slot arranged longitudinally of the houding,
   e. the plate including a guide portion extending into the slot and cooperating with slot margins to guide the plate, and hence the wire guide tube, longitudinally of the housing,
   f. the welding wire having its electrode contact tip connected to the end of the wire guide tube at a point within the housing and terminating at a point adjacent the end of the housing.

2. A welding head comprising:
   a. a housing provided with a flux discharge opening,
   b. a wire guide tube, through which a welding wire extends, located in and positioned longitudinally of the housing with its wire discharge end in alignment with the flux discharge opening,
   c. a plate of electrically insulating material slidably mounted on the housing and connected to the wire guide tube for longitudinal adjustment of the wire guide tube to determine the amount of welding wire projection through the flux discharge opening,
   d. pivot means pivotally mounting the wire guide tube intermediate of its ends to the fixed plate on an axis transversely of the wire guide tube, and
   e. wire guide tube-pivoting means for pivoting the wire guide tube about the axis to adjust the position of the wire discharge end laterally of the flux discharge opening.

3. A welding head as defined in claim 2, in which:
   f. the wire guide tube-pivoting means includes a screw of electrically insulating material mounted on the housing and engaging the wire guide tube in longitudinally spaced relation to the pivot axis.

4. A welding head as defined in claim 3, in which:
   g. the wire guide tube-pivoting means includes:
      1. a spring engaging the wire guide tube at the side opposite to the screw, and
      2. a cup receiving the spring and attached to the housing, the cup being of an electrically insulating material.

5. A welding head comprising:
   a. a housing provided with a flux discharge opening,
   b. a wire guide tube, through which a welding wire extends, located in and positioned longitudinally of the housing with its wire discharge end in alignment with the flux discharge opening,
   c. a pair of plates at opposite sides of the housing, the plates being of an electrically insulating material,
   d. pivot means connecting the wire guide tube to the plates on an axis transverse to the longitudinal axis of the housing, and
   e. fastening means connecting the plates to the housing and enabling longitudinal adjustment of the plates on the housing to determine the longitudinal position of the wire guide tube and the amount of wire projection through the flux discharge opening.

6. A welding head as defined in claim 5, in which:
   f. the housing is provided with opposed, elongate slots arranged longitudinally of the housing, g. the plates include portions received in the slots to guide the plates during the longitudinal adjustment, and h. the pivot means is attached to the plate portions located in the slots.

7. A welding head as defined in claim 6, in which:

i. each plate includes an elongate hole arranged longitudinally of the housing, and j. the fastening means includes fasteners extending through the elongate hole of each plate to interconnect and clamp the plate to the housing.

8. A welding head as defined in claim 7, in which:

k. the fasteners are of an electrically insulating material.

9. A welding head as defined in claim 7, in which:

k. each plate includes a pair of said elongate holes, one at each side of the pivot axis, and 1. the fastening means includes a pair of said fasteners, one extending through each of said holes.

10. A welding head as defined in claim 7, in which:

k. wire guide tube-pivoting means is provided for pivoting the wire guide tube about the axis to adjust the position of the wire discharge end laterally of the flux discharge opening, and wire guide tube-pivoting means including a screw of electrically insulating material mounted on the housing and engaging the wire guide tube in longitudinally spaced relation to the pivot axis.

11. A welding head as defined in claim 10, in which:

l. the wire guide tube-pivot means includes:

1. a spring engaging the wire guide tube at the side opposite to the screw, and 2. a cup receiving the spring and attached to the housing, the cup being of an electrically insulating material.

* * * * *